United States Patent Office 2,859,225
Patented Nov. 4, 1958

2,859,225

MANUFACTURE OF ORGANOLEAD COMPOUNDS

Sidney M. Blitzer and Tillmon H. Pearson, Baton Rouge, La., assignors to Ethyl Corporation, New York, N. Y., a corporation of Delaware No Drawing. Application March 25, 1955
Serial No. 496,919

13 Claims. (Cl. 260—437)

This invention relates to a process for the manufacture of organolead compounds. In particular, this invention is directed to a novel process for the manufacture of tetraethyllead from lead oxides and sulfides.

The process employed in present commercial practice for the manufacture of tetraethyllead has been in use for a number of years and, in general, is satisfactory. However, it has certain disadvantages which are overcome by practicing our invention. It proceeds by reacting a sodium lead alloy, of composition controlled to correspond substantially to NaPb, with ethyl chloride according to the following equation $$4NaPb + 4C_2H_5Cl = (C_2H_5)_4Pb + 3Pb + 4NaCl$$

With the highest yields obtained thereby, only about 22 percent of the lead present in the NaPb alloy is converted to tetraethyllead. Under conditions of best operation of this process, no one heretofore, as far as we are aware, has been able to increase this yield of tetraethyllead by even a few percent, due to the inherent limitation in yield as is apparent from the consideration of the above equation. It should be noted that in this reaction at least 75 percent of the lead originally employed is not alkylated. Thus, in this reaction, large quantities of lead must be recovered and reprocessed to NaPb alloy in order to make it economical. A further disadvantage of such a large quantity of unreacted lead is that valuable reaction space in the reaction vessel is occupied by materials which are essentially inert for the manufacture of tetraethyllead under present conditions and mode of operation.

Other processes for the production of organolead compounds, and in particular tetraethyllead, have been devised to consume the lead produced in the above equation. While such processes are satisfactory from the standpoint of lead consumption, they suffer an additional drawback in common with the present commercial process in that they require organo halide as the ethylating agent. One such process is that described in U. S. Patent 2,535,190 wherein lead as, for example that produced in the commercial process, is treated with metallic magnesium and ethyl chloride in the presence of a catalyst, preferably an alkyl ether. Thus, in this process as well as the present commercial process, the tetraethyllead manufacturing operation is restricted by the necessary balance between the metallic sodium required and the organic chlorine in the ethyl chloride. A classical method for the manufacture of tetraethyllead which likewise requires strict balance between metallic magnesium and organic halide, and has the additional drawback of requiring highly hazardous ether is the reaction of the so-called Grignard reagent, for instance ethyl magnesium chloride with lead chloride.

It is therefore an object of this invention to provide a process for the manufacture of organolead compounds which overcomes the above objections to the present commercial process and those processes which have been proposed more recently as an improvement there over. Particularly, it is an object of the invention to increase the conversion of lead to tetraethyllead above that obtained in present commercial practice without requiring the use of metallic sodium, metallic lead, alkyl halogen compounds, or lead halides.

These and other objects of this invention are accomplished by reacting a lead chalkogen, i. e., lead oxide or sulfide, with a non-lead metalloorganic compound of sufficient stability under reaction conditions, where the organo portion is a hydrocarbon radical and wherein the metallo element is directly attached to carbon and may additionally be attached to another metallic element. In certain embodiments of this invention it is preferred to employ a catalyst. The so-called metalloid elements are not contemplated as they do not form true metalloorganic compounds. Thus, this invention comprises the metathetical reaction between lead chalkogen and a non-lead metalloorganic compound.

In general, the metalloorganic reactants of the present invention have the general formula $M^1R_y$ or $M^2M^1R_y$, where $M^1$ and $M^2$ are true metals other than lead, R is an organic radical, and in particular a hydrocarbon radical, and $y$ is an integer from 1 to 4, inclusive. It is not intended that the above formulas limit the reactants in the choice of the groups R, as non-lead metalloorganic compounds containing a plurality of hydrocarbon radicals, R, can be successfully employed in this invention.

In the preferred embodiment of this process the organic radicals are hydrocarbons and particularly are non-aromatic or aromatic radicals. Among the non-aromatic radicals we can employ alkyl or hydrocarbon substituted alkyl radicals. In general, we prefer the lower alkyl radicals having up to about eight carbon atoms. Among the aromatic radicals which can be employed in the above reaction are included phenyl and hydrocarbon substituted phenyl radicals having up to 10 carbon atoms are satisfactory. Thus, the compounds $M^1R_y$ and $M^2M^1R_y$ may be considered alkylating or arylating agents with respect to the lead in the inorganic lead compound.

Depending upon the valence of the non-lead metallo element employed, the process of this invention can be better understood by referring to the following three general equations:

I. $4M^1R + 2PbY \rightarrow PbR_4 + Pb + 2M_2^1Y$

II. $2M^1R_2 + 2PbY \rightarrow PbR_4 + Pb + 2M^1Y$

III. $(4-2n)M^2M^1R_{(n+3)} + (6-2n)PbY \rightarrow (3-n)PbR_4 + (3-n)Pb + (2-n)M_2^1Y_3 + nM_2^2Y$ In the equations above, the symbols have the same meaning as hereinbefore defined and Y is a chalkogen, i. e., oxygen or sulfur. In Equation III, $n$ is 0 or 1. Similar equations apply for other metallic elements.

Among the preferred non-lead metals to be employed in the process of this invention are the alkali metals; i. e., lithium, sodium, and potassium; the alkaline earth metals, i. e., beryllium, magnesium, calcium, strontium, and barium; the group II–B metals, zinc and cadmium; the group III–A metals, alluminum, gallium, and indium; and combinations thereof. In such combination, each metal is only attached to the other metal and to carbon. A preferred embodiment is the combination of bi-metal metalloorganic compounds comprising monovalent and trivalent metallo elements.

Illustrative of the alkylating or arylating agents which can be employed are methyl sodium, methyl potassium, methyl lithium, dimethyl magnesium, dimethyl calcium, dimethyl zinc, dimethyl cadmium, trimethyl aluminum, sodium zinc tetramethyl, magnesium aluminum tetramethyl, potassium aluminum tetramethyl, ethyl sodium, ethyl potassium, ethyl lithium, diethyl magnesium, diethyl calcium, diethyl zinc, diethyl cadmium, triethyl aluminum, sodium boro tetraethyl, lithium aluminum tetraethyl, potassium aluminum tetraethyl, propyl sodium, propyl potassium, propyl lithium, dipropyl magnesium, dipropyl calcium, dipropyl zinc, dipropyl cadmium, tripropyl aluminum, sodium gallium tetrapropyl, lithium aluminum tetrapropyl, aluminum boro tetraethyl, octyl sodium, octyl potassium, octyl lithium, dioctyl magnesium, dioctyl calcium, dioctyl zinc, dioctyl cadmium, sodium aluminum tetraoctyl, potassium aluminum tetraoctyl, phenyl sodium, phenyl potassium, phenyl lithium, diphenyl magnesium, titanium tetraethyl, diphenyl zinc, diphenyl cadmium, triphenyl aluminum, lithium aluminum tetraphenyl, tolyl sodium, tolyl potassium, tolyl lithium, ditolyl calcium, ditolyl zinc, zirconium tetramethyl, tritolyl aluminum, lithium aluminum tetratolyl, potassium aluminum tetratolyl, naphthyl sodium, naphthyl potassium, naphthyl lithium, dinaphthyl magnesium, sodium aluminum tetranaphthyl, lithium aluminum tetranaphthyl, and the like.

In addition to the normal alkyl derivatives indicated heretofore, branched chain isomers can be employed. Likewise a mixture of two or more compounds $M^1R_y$ and $M^2M^1R_y$ can be employed, and if employed along with a redistribution catalyst there is produced a mixture of organolead compounds containing a multiplicity of hydrocarbon radicals. Likewise, when the groups R are dissimilar, mixed organolead compounds result.

Among the preferred lead salts employed in this invention are galena, litharge, massicotite, and chemically prepared lead oxide and sulfide.

By the process of this invention, as much as 50 percent of the lead in the foregoing lead salts is directly converted to organolead or in particular, in a commercial embodiment, to tetraethyllead. The remaining portion of the lead is in a highly active form as lead metal and is ideally suited for employment in the commercial process employing sodium-lead alloy or in that which proposes the reaction of metallic lead with an alkylating agent in the presence of magnesium and a catalyst. Conversely, the lead so produced by this invention can be recycled economically to the present process by conversion to the appropriate lead salt.

Our invention is adaptable to the production of organolead compounds generally, such as tetraethyllead, tetramethyllead, dimethyldiethyllead, tetraphenyllead, triethylphenyllead and tetrapropyllead. Nevertheless, for convenience in describing our invention hereafter, specific reference may be made to tetraethyllead, the most widely known because of its use as an anti-knock agent. Whenever, in the following description, this material is referred to, it is to be understood that other organolead compounds or mixtures can be made by our process. While this invention is adapted to employ broadly the stable metallo-organic compounds defined heretofore, for convenience specific reference may be made hereinafter to employ aluminum triethyl as the preferred embodiment in manufacturing the important antiknock material, tetraethyllead.

Generally, the process of this invention is conducted as follows. Into a reaction vessel, preferably a stirred autoclave, is placed the desired quantity of an inert liquid carrier such as, for example, a hydrocarbon of medium boiling range. The lead oxide or sulfide in finely divided solid form is introduced through a hopper containing a plug cock into the autoclave while agitating to create a suspension thereof in the inert carrier. A suspension or solution of the non-lead organo metallic compound in an inert liquid carrier is then fed to the reactor. The autoclave is sealed and moderate heat is applied while continuing the agitation. Thereupon, an exothermic reaction ensues and upon reaching the desired reaction temperature, cooling is provided through a jacket in the autoclave. In contrast to other processes for the manufacture of tetraethyllead, when this invention is employed it is not necessary to provide expensive and complex reflux equipment as, by proper choice of the carrier liquid, the reaction can be conducted in a closed system. Thus, tetraethyllead can be produced without the co-presence of ethyl chloride or diethyl ether in the closed vessel. This greatly facilitates control of the reaction and prevents the existence of an otherwise hazardous operation. After completion of the reaction, the organolead compound produced is in solution in the carrier liquid and the other products, namely the non-lead oxide or sulfide and metallic lead can be removed by filtration and the organolead compound removed from the carrier by distillation. An alternate and successful method of recovery comprises discharging the autoclave contents into a vessel containing water and recovering the organolead by steam distillation therefrom.

The operation described above can be varied and it is not intended that this invention be limited to the specific sequence of addition of the reactants. For example, the suspension of the non-lead organo metallic compound can be added to the reactor first and then the finely divided lead oxide or sulfide added thereto with agitation. Other modifications will be evident.

While the above operations were discussed in connection with a batch operation, they can be successfully adapted to a continuous process. In addition to applying the above operation to a continuous process, other modifications of a continuous process can be made, such as first mixing together all the reaction materials and then passing them continuously through a suitable reaction zone.

It has been indicated that the process of the present invention is conducted in the presence of an inert carrier liquid. Hydrocarbons of appropriate boiling point with respect to the organolead compound produced are satisfactory and can be chosen so as to provide a solution of the product suitable for other applications so that they can be readily removed by distillation at a temperature at which the organolead compound will not decompose. Other inert carrier liquids are satisfactory and where the product is a liquid such as, for example, in the manufacture of tetraethyllead, the organolead compound itself can be employed as a carrier liquid. In such an operation, economics are effected by obviating the necessity of recovery by other means than merely filtration of the co-produced solids. Another class of carrier liquids comprises the liquid amines and liquid ammonia. The principal criterion of choice therefore, of a carrier, is the physical characteristic of the organolead compound produced, and the inertness of the liquid to the organo metallic reactant. Certain of the aforementioned reactant carriers, while inert to the reactants, exhibit a beneficial effect on the reaction which may be considered catalytic in nature and contribute to the ease of reaction and rapidity of arriving at completion of the reaction at relatively lower temperatures and pressures.

In general, when conducting this process in the presence of a liquid carrier as above, the amount of carrier should be proportioned so as to provide adequate heat removal facilities. In general, the load on the heat transfer medium is proportional to the concentration or relative proportion of the reactants and carrier. In a batch operation it is preferred to employ the liquid diluent in the proportion of as much as 1,000 parts per part of organo metallic reactant. In a continuous operation or in an operation providing the maximum heat transfer medium, a more concentrated reaction mixture can be employed wherein as little as equal parts by weight of carrier and organo metallic reactant are employed. In general, it has been found that a more concentrated reaction mixture provides a rapid reaction and, provided adequate heat removal means are provided, this is an advantage as the organolead product is subjected to the elevated reaction temperature for the shortest practical time thereby minimizing thermal decomposition or undesirable side reactions.

The organo metallic compounds employed as the reactants of this invention can be prepared by methods well known in the art. For example, the alkali metal compounds can be prepared by reaction of the alkali metal with an organomercury compound. Thus lithium ethyl is prepared by reaction of metallic lithium with diethyl mercury. The organoalkaline earth reactants can be produced by reacting the metal with an organic halide. Thus, diethyl magnesium is prepared by reacting ethyl chloride with magnesium turnings in the presence of diethyl ether, followed by addition of dioxane, thereby creating a separate liquid phase containing diethyl magnesium, halide-free, in a mixture of diethyl ether and dioxane. Group IIIA organo compounds can be produced by reaction of the group IIIA halide with an alkali metal organo compound. Thus aluminum triethyl is produced by reaction of lithium ethyl and aluminum trichloride. The group IIA reactants can be prepared by direct reaction of the metal and an organic halide. Thus, zinc diethyl is produced by reacting a zinc-copper couple with ethyl chloride and distilling diethyl zinc from the reaction mixture. The mixed metal organics are typified by lithium aluminum tetraethyl which can be prepared by reaction of lithium hydride and aluminum chloride to first form lithium aluminum hydride, which is then alkylated with ethylene. Many of the organometallic compounds have recently been described as being derivable by direct alkylation of the corresponding metal hydride. Compounds so produced are likewise satisfactory in the process of this invention, and indeed are sometimes preferred.

This invention can be further understood by the following detailed working example of one method of practicing this invention as directed to the manufacture of tetraethyllead.

*Example I*

An autoclave equipped with internal agitation, external heating means, and external cooling means is employed having a hopper attached thereto for containing finely divided lead salt. The hopper has a plug cock at the discharge end for admission of the lead salt to the autoclave. To the autoclave are added 87 parts of toluene, agitation is commenced and 3.0 parts of lead oxide of particle size of less than 1/32 inch were admitted to the autoclave. The stop cock of the hopper was closed. The autoclave is purged with dry nitrogen gas, then 1.5 parts of triethyl aluminum are fed thereto. The reaction mixture, while under a nitrogen atmosphere, was then heated and the temperature maintained by alternate heating and cooling as required between 80° and 85° C. for a total reaction period of three hours. The reaction mixture was cooled to room temperature and the mixture was then filtered to remove solid constituents which are further processed for recovery of lead value. The filtrate was washed with an equal volume of water. The organic layer was transferred to a still for removal by vacuum distillation of the toluene and recovery of the tetraethyllead from the mixture. High conversion was obtained at an almost quantitative yield of tetraethyllead.

Similarly, when trimethyl aluminum, tripropyl aluminum, triphenyl aluminum, tribenzyl aluminum, triethyl aluminum, and tributyl aluminum are employed in the process of the foregoing example, satisfactory yields of tetramethyllead, tetrapropyllead, tetraphenyllead, tetrabenzyllead, tetraethyllead, and tetrabutyllead are produced, respectively. Likewise, when trimethyl boron, tripropyl gallium, triphenyl indium, tribenzyl gallium, triethyl boron, and tributyl indium are employed in the process of the foregoing example, satisfactory yields of tetramethyllead, tetraproplyllead, tetraphenyllead, tetrabenzyllead, tetraethyllead, and tetrabutyllead are produced, respectively.

In general, the reaction of this process is completed within a relatively short period at elevated temperatures, but a somewhat longer time is required at lower temperatures. In general, a reaction time of between about one-half to twenty hours is employed. In particular, in the manufacture of tetraethyllead with triethyl aluminum and lead sulfide, we prefer to employ a reaction time of about ten hours or less.

The pressure employed in the reaction vessel is not critical and is usually the autogeneous pressure created by the carrier liquid at the temperature employed. Since organolead compounds are relatively toxic, it is desirable to employ a closed vessel in conducting this reaction which may create an elevated pressure if low boiling carrier liquids are employed.

The temperature required to initiate the self-sustaining reaction of this invention varies with the organolead compound being produced. In general, with the lower alkyl lead compounds such as tetramethyllead, it is preferred to employ temperatures in the range of 25° to 150° C. With aryllead compounds, for example tetraphenyllead, it is preferred to operate in the range of 50° to 150° C.

While it was indicated above that, in general, a catalyst is not required for the practice of this invention, certain materials do exhibit a catalytic effect upon the reaction and, in many instances, their inclusion in the reaction provides a smoother operation. Typical of such materials are heavy metal iodides as well as iodine itself, organic iodides, certain ketones such as acetone and methyl ethyl ketone, and ethers, amines, and aromatic solvents as indicated heretofore.

The following detailed examples serve to illustrate additional specific embodiments of the present invention. However, the invention is not intended to be limited thereto.

*Example II*

The equipment employed is the same as that in Example I. The autoclave is flushed with nitrogen, then 50 parts of benzene are added thereto, the agitation is commenced and 3.5 parts of lead oxide are dropped from the hopper into the autoclave and the plug cock is closed. A suspension of 1.82 parts of ethyl potassium in 100 parts of benzene is added to this mixture while continuously being agitated. The reactor is then heated to about 80° C. initiating the exothermic reaction. The heat is removed and external cooling is commenced in order to maintain the temperature between 90° and 100° C. The pressure which develops in the system during the reaction is about 20 pounds per square inch gage. At the end of four hours reaction period, the reaction mixture is cooled to room temperature. To the reaction mixture is added sufficient isopropanol, about 28 parts, in order to destroy excess ethyl potassium. The resulting mixture is filtered to remove the solid constituents. The solids are processed for recovery of the lead value. The filtrate is washed as described in Example I and the organic layer is processed for recovery of the tetraethyllead. Based on the lead converted to organolead, a nearly quantitative yield of tetraethyllead was produced.

In place of the benzene employed in the foregoing example as an inert carrier liquid, equally good results are obtained when toluene, xylene, triethylamine, or diphenyl are employed. In addition to the ingredients specified in the foregoing example, thermal stabilizers may be employed, such as for example naphthalene and styrene to permit operation of the reaction at still higher temperatures without concomitant decomposition of the tetraethyllead so produced.

*Example III*

Amyl sodium is reacted with lead sulfide in substantially stoichiometric amounts essentially as described in Example II to produce tetraamyllead in high yield. The amyl sodium and lead sulfide are suspended in a $C_{10}$–$C_{12}$ hydrocarbon petroleum fraction as the inert diluent thus permitting operation at atmospheric pressure.

*Example IV*

The procedure of Example II is conducted essentially as described with the exception that phenyl sodium is reacted with lead oxide employing benzene as a diluent. The reaction is conducted for a period of ten hours with the temperature maintained between 110° and 120° C. Tetraphenyllead is obtained in high yield.

*Example V*

When benzyl sodium is reacted with lead oxide in substantially stoichiometric amounts, essentially as described in Example II, tetrabenzyllead is obtained in high yield. The reaction is conducted for a period of eight hours at a temperature of 110° to 115° C.

The following example will demonstrate another embodiment wherein the tetraethyllead is used as the inert carrier.

*Example VI*

Ethyl sodium is prepared in the usual manner to result in a suspension comprising 8.30 parts of finely divided ethyl sodium in 260 parts n-hexane. To this suspension is added about 100 parts of tetraethyllead. The mixture is then heated to vaporize essentially all of the hexane therefrom. To the autoclave of Example I is added about 50 parts of tetraethyllead and then 8.8 parts of finely divided lead sulfide are added thereto with agitation. The suspension of the ethyl sodium in tetraethyllead is added to the autoclave and it is sealed. The autoclave is heated to about 80° C. and then by means of cooling and heating, as necessary, the reaction temperature is maintained between 80° and 90° C. At the end of seven hours the reaction mixture is cooled to room temperature, treated with alcohol, washed and filtered as in the above examples. The tetraethyllead prepared in this manner is recovered in high yield and high purity.

The above embodiment employing tetraethyllead as a carrier liquid is equally satisfactory when the ethylating agent employed is ethyl potassium, ethyl lithium, diethyl beryllium, diethyl magnesium, diethyl calcium, diethyl beryllium, diethyl strontium, diethyl zinc, diethyl cadmium, triethyl aluminum, triethyl gallium, triethyl indium, sodium aluminum tetraethyl, potassium aluminum tetraethyl, lithium aluminum tetraethyl, and the like.

*Example VII*

The procedure of Example I was followed with the exception that the temperature was maintained between about 116° and 123° C. and the reaction period was 3¼ hours. 2.36 parts of diethyl zinc were reacted with 3.11 parts of lead sulfide of particle size less than ⅛ inch in 200 parts n-hexane. Tetraethyllead was recovered in nearly quantitative yields and high conversion. The unreacted lead sulfide is recycled to a second operation for further conversion to tetraethyllead.

In place of the n-hexane employed in the foregoing example as an inert carrier liquid, equally good results are obtained when toluene, xylene, triethyl amine, or diphenyl are employed. In addition to the ingredients specified in the foregoing example, thermal stabilizers may be employed, such as for example naphthalene and styrene to permit operation of the reaction at still higher temperatures without concomitant decomposition of the tetraethyllead so produced.

*Example VIII*

Tetrabutyllead is prepared when reacting 4.0 parts of di-n-butyl zinc with 5.0 parts of finely divided lead oxide in 150 parts cyclohexane at a temperature of 100° C. for five hours according to the procedure of Example I. Similarly, when butyl zinc, or dibutyl cadmium is reacted with lead sulfide as in the foregoing example, and at a temperature between about 90° and 100° C., equally satisfactory results are obtained.

*Example IX*

A reactor equipped with internal agitation, an external means for heating and an external means for cooling is employed which has the usual inlet and outlet ports for introduction of reactants and discharge of product. The reactor is also equipped with a reflux condenser in order to reflux any vapors which may form. To the reactor are added 150 parts of petroleum ether and then 2.9 parts of finely divided lead oxide are added thereto with agitation. An atmosphere of nitrogen is then maintained in the reactor and 2.36 parts of diethyl zinc are added thereto. The reaction mixture is heated to a temperature of 140° C. and maintained at this temperature by alternate heating and cooling as required for a period of four hours. At the end of this period, the reaction mixture is cooled to room temperature and filtered to remove solids. The filtrate is washed with an equal volume of water. The organic layer is separated from the water and transferred to a still where, by fractional distillation under vacuum, the tetraethyllead is recovered from the petroleum ether.

Certain of the organo zinc and cadmium compounds are solid. When employing the solid organo compounds, it is preferable to first dissolve them in a suitable solvent for ease of handling. Such a procedure is described by the following example.

*Example X*

The reaction equipment employed is the same as that of Example IX. To the reactor are added 150 parts of xylene and then 2.5 parts of finely divided lead oxide are added with agitation. The reactor is then maintained under a dry nitrogen atmosphere for the remainder of the cycle. Diphenyl cadmium, 3.0 parts, are dissloved in 50 parts xylene under a nitrogen atmosphere. This solution is admitted to the reactor, the reaction mixture is heated to a temperature of 100° C. and maintained at this temperature by alternate heating and cooling, as required, for a period of six hours. The reaction mixture is then cooled to room temperature and filtered to remove the solids as in the preceding examples. The filtrate is washed with an equal volume of water and the organic layer is separated therefrom. Tetraphenyllead is recovered in high yield from the organic layer by vacuum distillation.

*Example XI*

Following the procedure of Example I, with the exception that the autoclave was sealed after adding the reactants, 1.5 parts of triethyl aluminum were reacted with 3.11 parts of lead sulfide in 200 parts of n-hexane. The temperature employed was 118° to 120° C. and the reaction period was four hours. High conversion to tetraethyllead was obtained and unreacted lead sulfide was recycled for additional conversion.

In the above example, n-hexane was replaced by 200 parts and 20 parts of toluene. The conversion at the latter concentration was nearly twice that at the former. Further reduction in the amount of toluene resulted in a corresponding increase in the yield of tetraethyllead.

*Example XII*

Tetrahexyllead is prepared in high yield by reacting trihexyl aluminum with lead oxide in essentially stoichiometric amounts in the presence of cyclohexane at atmospheric pressure and at a temperature of 80° to 95° C. for three hours reaction time.

*Example XIII*

Again employing the procedure of Example XI, tetraphenyl lead is obtained in high yield when triphenyl aluminum dissolved in benzene is reacted with lead sulfide in essentially stoichiometric quantities. The temperature employed is 75° to 83° C. for a period of 5½ hours.

*Example XIV*

Example I is repeated essentially as described with the exception that tetraethyllead is employed as the diluent and the reaction temperature is 90° to 100° C. In this instance, the process is conducted continuously by continuously feeding the triethyl aluminum and lead oxide to the reactor and withdrawing a slurry of solids in tetraethyllead from the reactor leaving a heel of tetraethyllead sufficient to maintain fluidity of the reaction mixture.

Equally good results are obtained when the corresponding and other organo compounds of gallium, boron, and indium are employed in the above examples. For example, triethyl gallium, indium, or boron can be reacted with lead sulfide to produce tetraethyllead. Triphenyl gallium, indium, or boron, preferably dissolved in a suitable solvent such as benzene, can be reacted with lead oxide to produce tetraphenyllead. Other examples will be evident.

Example XV

The equipment employed was a reactor equipped with internal agitation, external heating means, a means for maintaining an inert atmosphere, a reflux condenser, and the usual inlet and outlet ports for admission of reactants and discharge of product. All operations were conducted in a dry nitrogen atmosphere until the ethyl lithium was consumed. A solution of 21.6 parts of ethyl lithium in 1060 parts of diethyl ether, prepared in the usual manner, was introduced to the reactor. With continuous agitation 66.9 parts of finely divided lead oxide was added to the ethyl lithium solution. The reaction mixture was refluxed for three and one-half hours. At the end of this period, it was cooled to room temperature and 80 parts of isopropyl alcohol were added to destroy excess ethyl lithium. The mixture was then washed with 300 parts of water, the ether layer decanted and dried over calcium chloride. The ether layer was then stripped by distillation to remove essentially all ether. The residue, 26.3 parts, was redistilled at 10 mm. and a clear white fraction boiling between 78°–82° C. at 10 mm. weighing 16.6 parts was collected. This fraction was 97.2 percent pure tetraethyllead.

In place of the diethyl ether employed in the foregoing example as an inert carrier liquid, equally good results are obtained when toluene, xylene, triethyl amine, or diphenyl are employed. In addition to the ingredients specified in the foregoing example, thermal stabilizers may be employed, such as for example naphthalene and styrene to permit operation of the reaction at still higher temperatures without concomitant decomposition of the tetraethyllead so produced.

Example XVI

When conducting the process essentially as described in Example I, with the exception that the ethyl lithium was reacted with 4.78 parts of lead sulfide in 165 parts of n-hexane at a temperature between about 114° and 122° C. for three and one-fourth hours, tetraethyllead was obtained in high yield and purity.

Example XVII

In this instance, 6.0 parts of finely divided lead oxide, suspended in 150 parts of n-hexane, are reacted with 4.2 parts of amyl lithium in 50 parts n-hexane. The procedure is essentially as described in Example I, with the exception that the reaction time is six hours at a temperature of 110° to 120° C. Tetraamyllead is produced in high yield.

Similarly, when amyl lithium is reacted with lead sulfide as in the foregoing example, and at a temperature between about 90° to 100° C., equally satisfactory results are obtained.

Example XVIII

When 4.0 parts of phenyl lithium in 50 parts benzene is reacted with 5.0 parts of finely divided lead oxide in 150 parts benzene according to the procedure in Example I, with the temperature at 130° to 135° C. for four hours, tetraphenyllead is obtained in high yield.

The following example will demonstrate the process when higher boiling diluents are employed.

Example XIX

The equipment employed is a reactor having a means for internal agitation and inlet and outlet ports for introduction of reactants, discharge of product, and maintaining an inert atmosphere. To the reactor is added about 200 parts of mineral oil and with agitation 5.1 parts of finely divided lead oxide. A stream of dry nitrogen gas is maintained in the reaction vessel during the remainder of the reaction. Then 2.34 parts of ethyl lithium in about 30 parts of mineral oil are added to the suspension of lead oxide. The vessel is heated to a temperature of 120° C., the heat removed and cooling applied to maintain this temperature. As the reaction proceeds, a temperature drop will be noted and heat is again applied in order to maintain the temperature between about 120° and 130° C. for a total reaction period of five hours. The agitation is then stopped and the reaction mixture is cooled to room temperature. Tetraethyllead is recovered as described in Example I in high yield.

The following example demonstrates the process of this invention wherein tetraethyllead is employed as the reaction medium.

Example XX

A solution of 4.68 parts of ethyl lithium in 70 parts of diethyl ether is prepared in the usual manner. To this solution is added about 60 parts of tetraethyllead. The suspension is then heated in a still under vacuum until essentially all the diethyl ether is vaporized and removed. The resulting mixture of ethyl lithium and tetraethyllead is then added to a suspension of 9.56 parts of finely divided lead sulfide in 300 parts of tetraethyllead in the autoclave of Example I. The reaction mixture is heated and the temperature maintained by alternate heating and cooling at between 110° and 120° C. for a period of seven hours. Tetraethyllead is recovered as described above in high yield.

Example XXI

The procedure of Example I is employed essentially as described with the exception that the lithium aluminum tetraethyl is reacted with 17.9 parts of finely divided lead oxide. Tetraethyllead is obtained in high yield and purity.

In place of the n-hexane employed in the foregoing example as an inert carrier liquid, equally good results are obtained with pentane, benzene toluene, xylene, triethyl amine, or diphenyl are employed. In addition to the ingredients specified in the foregoing example, thermal stabilizers may be employed, such as, for example, naphthalene and styrene to permit operation of the reaction at still higher temperatures without concomitant decomposition of the tetraethyllead so produced.

Example XXII

Again conducting the process essentially as described in Example I, tetraethyllead is prepared in high purity and yield when reacting another batch of lithium aluminum tetraethyl prepared as described with 18 parts of finely divided lead oxide at a temperature between 70° and 80° C. for a period of six hours.

Example XXIII

When lithium aluminum tetrahexyl is reacted with lead oxide in essentially stoichiometric amounts as described in Example I, tetrahexyllead is produced in high yield.

Example XXIV

Lithium aluminum tetra-(2-phenyl ethyl) is reacted with lead oxide in essentially stoichiometric amounts in accordance with the procedure of Example I to produce tetra-(2-phenyl ethyl) lead.

Example XXV

The procedure of Example I was repeated essentially as described with the exception that the reaction was conducted at room temperature at atmospheric pressure for 69 hours, under a nitrogen atmosphere. In this instance, 1.48 parts of diethyl magnesium in 30 parts diethyl ether-dioxane mixture were reacted with 3.35 parts of finely divided lead oxide in 87 parts of toluene. Upon recovery of the product by distillation under vacuum, greater than 50 percent conversion to tetraethyllead was obtained.

In place of the toluene employed in the foregoing example as an inert carrier liquid, equally good results are obtained when benzene, xylene, triethyl amine, or diphenyl are employed. In addition to the ingredients specified in the foregoing example, thermal stabilizers may be employed, such as for example naphthalene and styrene to permit operation of the reaction at still higher temperatures without concomitant decomposition of the tetraethyllead so produced.

Example XXVI

When 1.475 parts of diethyl magnesium in 30 parts of diethyl ether-dioxane mixture are reacted with 3.59 parts of lead sulfide in 87 parts of toluene under he conditions of Example XXV, tetraethyllead is obtained in high yield.

When substituting lead oxide in the foregoing example, the reaction proceeds satisfactory at temperatures in the range of 60° to 100° C. or at the atmospheric reflux temperature of a $C_6$ to $C_8$ hydrocarbon petroleum fraction.

Example XXVII

Following the procedure of Example I, tetraethyllead is obtained in high yield when reacting 3.05 parts of diethyl beryllium in 30 parts of n-butyl ether with 9.5 parts of lead oxide in 100 parts of toluene at a temperature of 110° C. for six hours.

Example XXVIII

When diphenyl magnesium is reacted with lead oxide in essentially stoichiometric quantities according to any of the above procedures, tetraphenyllead is obtained in high yield.

Example XXIX

Employing the procedure of Example I, lead sulfide is reacted with diethyl calcium in essentially stoichiometric amount to produce tetraethyllead in high yield.

Example XXX

Diamylbarium is reacted with lead oxide in stoichiometric amounts according to the procedure of Example I with the exception that the temperature employed is 120° to 130° C. for three hours. Tetraamyllead is obtained in high yield.

Equally good results are obtained when diamyl strontium is substituted for diamyl barium in the above example.

The following example will demonstrate one embodiment of this invention wherein the organolead compound produced is used as a diluent.

Example XXXI

The procedure of Example I is repeated with the exception of the following: the diethyl magnesium solution has added thereto 30 parts of tetraethyllead and then this mixture is subjected to distillation for substantial removal of the diethyl ether and dioxane. The autoclave is charged with 170 parts of tetraethyllead in place of the n-hexane. The reaction is then conducted as described. At the completion of the reaction a heel of about 170 parts of the reacted mixture is left in the autoclave ready for addition of the lead oxide and diethyl zinc-tetraethyllead mixture. Tetraethyllead is recovered in high yield.

A particularly advantageous and preferred method of utilizing the process of this invention as specifically directed to a commercial method of manufacturing tetraethyllead comprises starting with free metal and hydriding to produce the corresponding metal hydride as the first stage. A second stage then comprises reacting said hydride with ethylene preferably in the presence of a liquid diluent suitable as a carrier for the ethyl metal, which is thereafter reacted with the lead sulfide in accordance with the foregoing description of the present invention.

We claim:
1. A process for making hydrocarbon lead compounds which comprises reacting a lead chalkogen in which the chalkogen is selected from the group consisting of oxygen and sulfur with a stable metallo hydrocarbon compound having up to and including 10 carbon atoms in each hydrocarbon radical and wherein said metal in said metallo hydrocarbon compound is selected from the group consisting of alkali metals, alkaline earth metals, group II-B metals, group III-A metals, wherein the metal is attached to carbon, and combinations of such metals wherein each metal in said combination is only attached to the other metal and to carbon.

2. The process of claim 1 wherein said metallo hydrocarbon compound is a metallo hydrocarbon alkyl compound having up to and including 8 carbon atoms in each alkyl radical and the reaction is conducted at a temperature between about 25 to 150° C. in the presence of an inert liquid carrier.

3. The process of claim 2 wherein the metallo portion of said metallo hydrocarbon alkyl compound is a group III-A metal.

4. The process of claim 2 wherein said metallo hydrocarbon alkyl compound is triethyl aluminum.

5. A process for making tetraethyllead according to claim 2 which comprises reacting lead oxide with triethyl aluminum in toluene at a temperature between about 25 to 150° C. for a period between about ½ to 20 hours with agitation.

6. The process of claim 2 wherein the metallo portion of said metallo hydrocarbon alkyl compound is an alkali metal.

7. The process of claim 2 wherein said metallo hydrocarbon alkyl compound is ethyl sodium.

8. The process of claim 2 wherein the metallo portion of said metallo hydrocarbon alkyl compound is an alkaline earth metal.

9. The process of claim 2 wherein said lead chalkogen is lead oxide and said metallo hydrocarbon alkyl compound is diethyl magnesium.

10. The process of claim 2 wherein the metallo portion of said metallo hydrocarbon alkyl compound is a group II-B metal.

11. The process of claim 2 wherein said lead chalkogen is lead oxide, and said metallo hydrocarbon alkyl compound is diethyl zinc.

12. The process of claim 2 wherein the metallo portion of said metallo hydrocarbon alkyl compound is a combination of an alkali metal and a group III-A metal.

13. The process of claim 2 wherein said metallo hydrocarbon alkyl compound is sodium aluminum tetraethyl.

References Cited in the file of this patent
UNITED STATES PATENTS
2,786,860  Ziegler et al. _____ Mar. 26, 1957

OTHER REFERENCES
Leeper et al.: Chemical Reviews, 54, 108, February 1954, citing Austin: J. A. C. S., 54, 3726 (1932).